(12) United States Patent
Phelon

(10) Patent No.: US 6,408,716 B1
(45) Date of Patent: Jun. 25, 2002

(54) MAGNETO FLYWHEEL HAVING IMPROVED KEY

(75) Inventor: Russell D. Phelon, Aiken, SC (US)

(73) Assignee: R.E. Phelon Company, Inc., Aiken, SC (US)

( * ) Notice: Subject to any disclaimer, the term of this patent is extended or adjusted under 35 U.S.C. 154(b) by 0 days.

(21) Appl. No.: 09/570,246

(22) Filed: May 12, 2000

(51) Int. Cl.⁷ ............................. F16F 15/315; F16B 3/00
(52) U.S. Cl. ......................... 74/572; 74/603; 403/375
(58) Field of Search .................... 74/572, 603, 604; 403/359.6, 375; 123/146.5 A

(56) References Cited

U.S. PATENT DOCUMENTS

| | | | |
|---|---|---|---|
| 4,144,755 A | * | 3/1979 | Palloch |
| 4,262,548 A | * | 4/1981 | Haft et al. ................ 74/604 X |
| 4,285,305 A | * | 8/1981 | Kaufman et al. ..... 123/146.5 A |
| 4,836,297 A | * | 6/1989 | Dorner et al. ............ 74/603 X |
| 4,993,865 A | * | 2/1991 | Nagashima ............... 74/572 X |

* cited by examiner

*Primary Examiner*—Mary Ann Green
(74) *Attorney, Agent, or Firm*—Nelson Mullins Riley & Scarborough

(57) ABSTRACT

An improved flywheel for use in a small gasoline engine of the type utilized in string trimmers, chain saws, lawn mowers and other such devices. The flywheel comprises a flywheel body including a central hub portion and an integral wheel portion. The hub portion of the flywheel body defines an axial bore extending therethrough in which the engine's drive shaft is received when the flywheel is mounted thereon. An integral key is located in the axial bore for receipt in a corresponding keyway defined in the drive shaft. The key is configured without deep-cut stress reliefs, having opposed side walls extending directly from an inside surface of the through bore.

12 Claims, 6 Drawing Sheets

MAGNETO FLYWHEEL HAVING IMPROVED KEY

BACKGROUND OF THE INVENTION

The present invention relates generally to magneto flywheels utilized in small gasoline engines. More particularly, the invention relates to a magneto flywheel having an improved key.

Small gasoline engines, such as are frequently incorporated into string trimmers, chain saws, lawn mowers and other such devices, typically utilize a magneto ignition system. As is well known, a magneto ignition system will selectively produce a spark at the engine spark plug due to the magnetic cooperation between a stationary coil assembly and a rotating permanent magnet assembly.

Typically, the magnet assembly of the magneto ignition system will be carried by the engine's flywheel. Often, the flywheel will also include cooling vanes to circulate cooling air over the engine as the flywheel is rotated. The flywheel itself is generally mounted to a rotating shaft attached at one end to the engine's crank arm. The magnet assembly is positioned at a particular angular location about the axis of the shaft to ensure correct ignition timing.

In a typical construction, the flywheel is formed of cast aluminum. The hub of the flywheel defines a conical or "tapered" bore which mates with a complementary surface machined on the shaft. The tapered bore of the flywheel's hub includes a key located in a keyway defined on the tapered portion of the shaft. A securing element, such as a nut, maintains the flywheel in position on the shaft taper.

The flywheel is normally attached to the shaft at a level of tightening torque deemed to be optimum in a particular situation. For example, a typical cast aluminum flywheel having a 3.5 inch outer diameter may be attached to the shaft by a tightening torque of about 16 to 18 foot-pounds. Occasionally, however, a flywheel may be subjected to much higher tightening torques (e.g., 50 foot-pounds or more). The higher tightening torques may be due to overtightening at the factory, or may be caused in some cases by the design of downstream components such as clutches. Whatever the cause, severe overtightening of the flywheel has often resulted in flywheel breakage.

SUMMARY OF THE INVENTION

The present invention recognizes and addresses the foregoing disadvantages, and others of prior art constructions and methods. Accordingly, it is an object of the present invention to provide a novel flywheel for use in a small gasoline engine.

It is a particular object of the present invention to provide a flywheel for a small gasoline engine having an improved key.

It is a more particular object of the present invention to provide a flywheel for use in a small gasoline engine which is less susceptible to breakage due to overtightening.

It is also an object of the present invention to provide a flywheel for use in a small gasoline engine which may be efficiently manufactured.

Some of these objects are achieved by a flywheel mountable to a drive shaft of a small internal combustion engine. The flywheel comprises a flywheel body including a central hub portion and an integral wheel portion. The hub portion of the flywheel body defines an axial bore extending therethrough in which the engine's drive shaft is received when the flywheel is mounted thereon. An integral key is located in the bore for receipt in a corresponding keyway defined in the drive shaft. The key has opposed side walls extending directly from an inside surface of the through bore about a radius located at the respective base thereof.

The key defines a top surface extending between the opposed side walls, which may have an arcuate profile in the axial direction of the bore. Preferably, the key in such embodiments will have an axial extent less than that of the axial bore. For example, the arcuate profile of the top surface may terminate at both ends thereof by convergence into the inside surface of the axial bore. The axial bore itself will often be configured having a conical configuration.

Other objects of the present invention are achieved by a flywheel mountable to a drive shaft of a small internal combustion engine. The flywheel comprises a flywheel body including a central hub portion and an integral wheel portion. The hub portion of the flywheel body defines an axial bore extending therethrough in which the engine's drive shaft is received when the flywheel is mounted thereon.

The flywheel further comprises an integral key located in the axial bore for receipt in a corresponding keyway defined in the drive shaft. The key has opposed side walls and a top surface extending therebetween. The side walls of the key extend directly from an inside surface of the through bore. In addition, the top surface of the key has an arcuate profile in the axial direction of the axial bore.

In addition, the flywheel includes a magneto assembly located adjacent a periphery of the wheel portion of the flywheel body. A plurality of vane members, configured to pass air around the flywheel during operative rotation thereof, are integrally formed on the wheel portion of the flywheel body. At least one counterweight assembly is located adjacent a periphery of the wheel portion so as to balance the magneto assembly during operative rotation of the flywheel.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
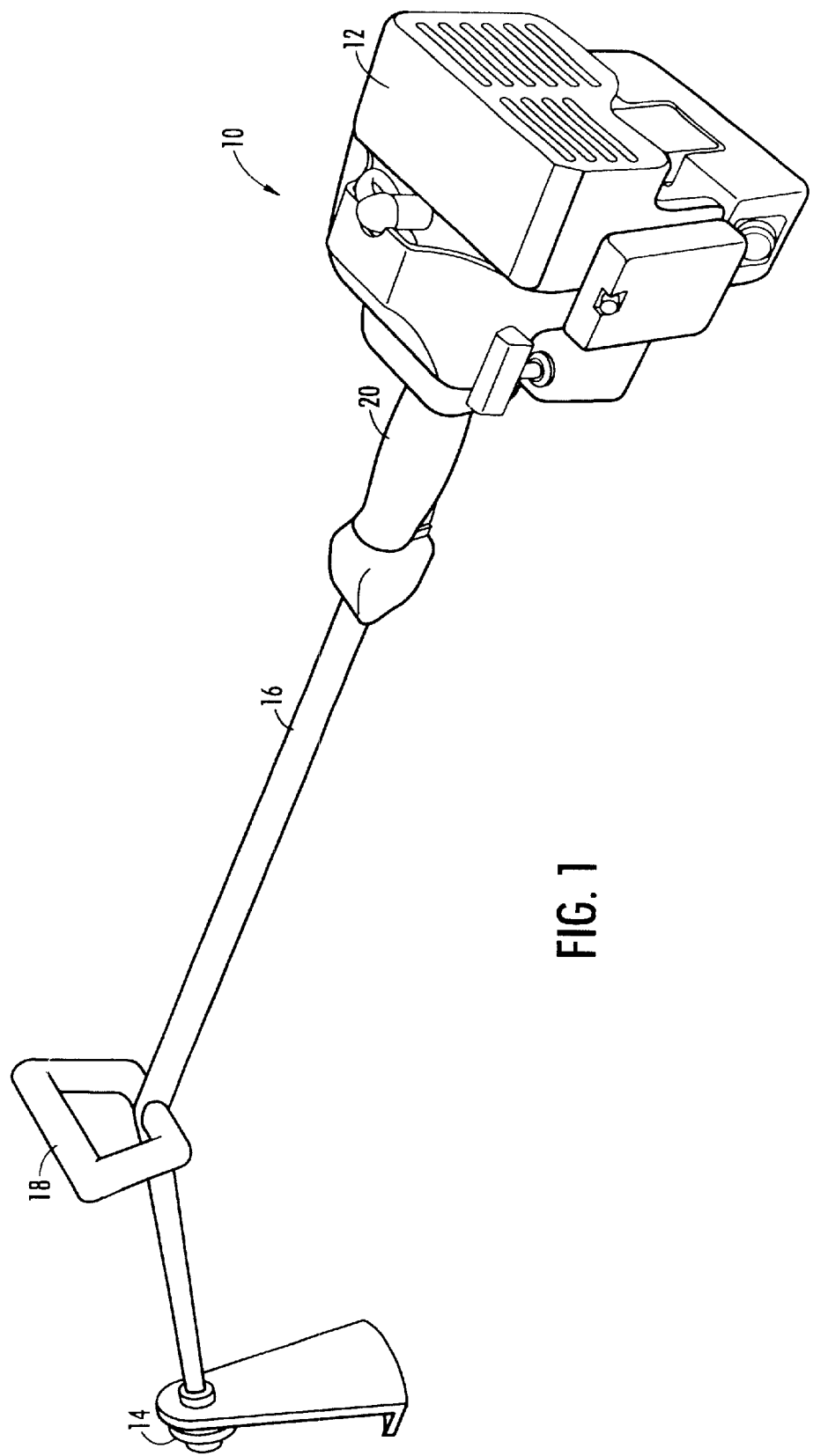
FIG. 1 is a perspective view of a string trimmer device in which a flywheel of the present invention may be utilized.

Repeat use of reference characters in the present specification and drawings is intended to represent same or analogous features or elements of the invention.

DETAILED DESCRIPTION OF PREFERRED EMBODIMENTS

It is understood by one skilled in the art that the present discussion is a description of exemplary embodiments only, and is not intended as limiting the broader aspects of the present invention, which broader aspects are embodied in the exemplary construction.

Referring to FIG. 1, a string trimmer 10 is illustrated as being typical of a gasoline engine powered device which may utilize a flywheel constructed in accordance with the present invention. As is well known, string trimmer 10 includes a housing 12 containing a small gasoline engine. The engine drives a cutting spool 14 at the end of an elongate tube 16. During use, an operator grasps handles 18 and 20 to manipulate string trimmer 10. The engine's throttle is controlled by a trigger located at handle 20.

Figure 2:
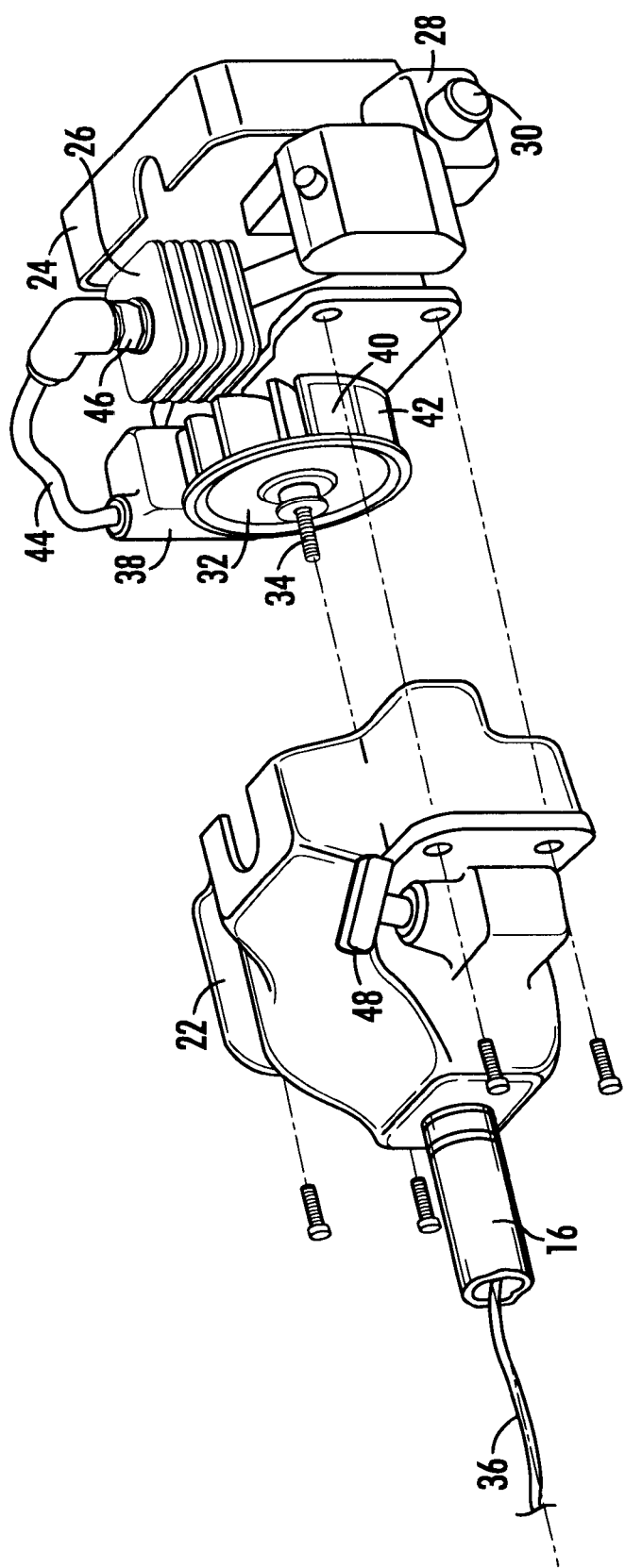
FIG. 2 is an enlarged view showing the housing of the string trimmer device of FIG. 1 opened to reveal the flywheel.

Referring now to FIG. 2, respective portions 22 and 24 of housing 12 are separated to reveal various internal components therein. As illustrated, the engine includes a cylinder head 26, within which the piston is contained. Because the engine is air-cooled in this case, cylinder head 26 carries thereon a plurality of cooling fins. Fuel for engine operation is stored in gas tank 28, which is filled by removing gas cap 30.

Operative reciprocation of the piston within cylinder head 26 causes rotation of a drive shaft on which a flywheel 32 is mounted. In this case, flywheel 32 is maintained in position on the drive shaft by a retaining nut 34. A flexible rod 36, located inside of tube 16, is connected at its distal end to spool 14. The proximal end of rod 36 is connected to nut 34 such that operation of the engine will cause rotation of spool 14.

The requisite ignition spark for providing combustion within cylinder head 26 is generated in this case by a magneto ignition system. The magneto ignition system includes a stator module 38 having a primary coil and a secondary coil wound about a common magnetically permeable core. A time varying flux is generated within the core by magnetic cooperation with a permanent magnet assembly carried by flywheel 32. Specifically, rotation of flywheel 32 causes pole faces 40 and 42 of the magnet assembly to pass generally complementary pole faces of the stator module's core.

In many embodiments, the magneto ignition system may be of a type referred to as a capacitive discharge ("CD") ignition. An exemplary CD ignition which may be utilized for this purpose is shown and described in U.S. Pat. No. 4,036,201, issued Jul. 19, 1977 to Burson, incorporated herein by reference. In such an ignition, the time varying magnetic flux functions to charge an appropriate storage capacitor. At a predetermined time, the capacitor will discharge through the primary coil of stator module 38. A large voltage is thus induced on the secondary coil according to the primary-to-secondary turns ratio. This higher voltage is applied by spark plug wire 44 to the engine's spark plug 46.

As is common with gasoline engines of this type, the engine of string trimmer 10 is started utilizing a recoil starting mechanism. The starting mechanism includes a starting handle 48 attached to a pull cord. The pull cord is typically wrapped about a pulley which is combined with a rachet wheel. The rachet wheel is engaged during cranking by a pair of pawls (not shown) pivotally mounted to flywheel 32. In this case, the starting pawls are attached to the "back" of flywheel 32 (i.e., the side juxtaposed by nut 34). In other devices, it may be desirable to attach the pawls to bosses on the "finned" side of the flywheel. After the engine is cranked, centrifugal force will pivot the pawls out of engagement with the rachet wheel.

Figure 3A:
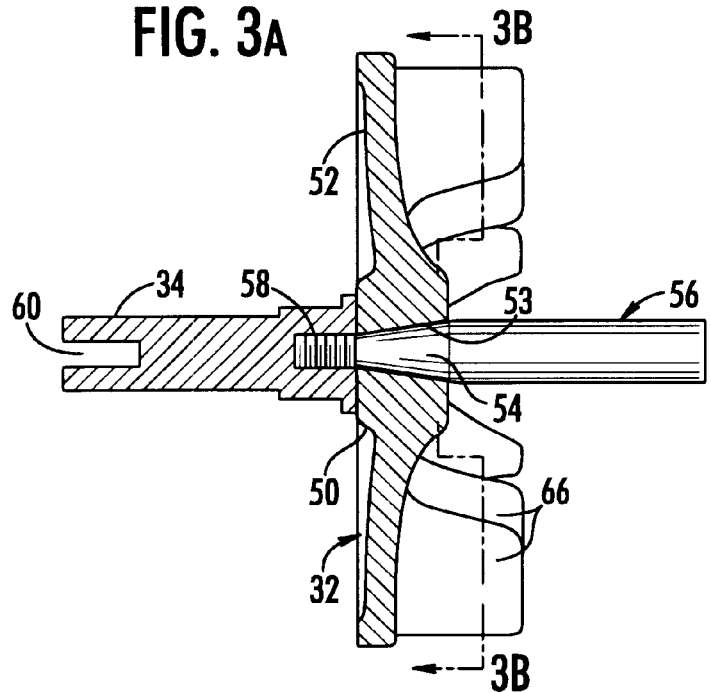
FIG. 3A is a cross sectional view of the flywheel of FIG. 2.
Figure 3B:
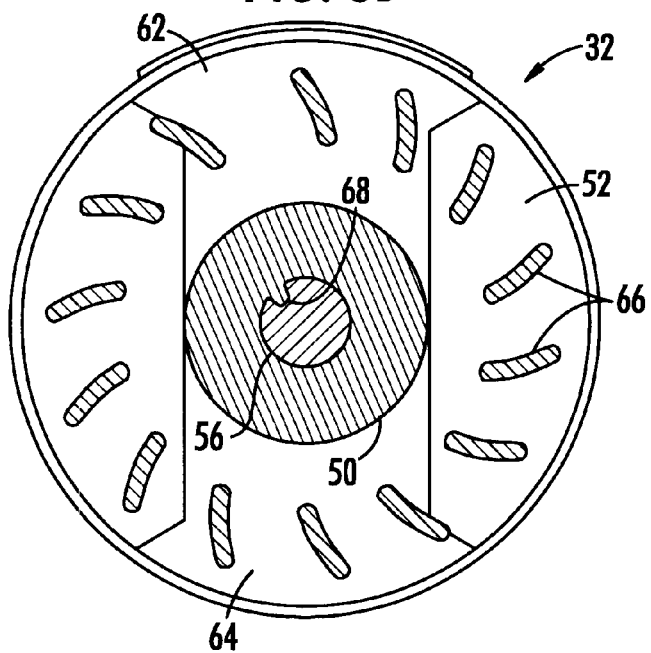
FIG. 3B is a cross sectional view of the flywheel of FIG. 3A as taken along line 3B—3B.

Further details regarding the construction of flywheel 32 can be seen in FIGS. 3A and 3B. As shown, flywheel 32 includes a central hub portion 50 integrally extending into a wheel portion 52. Hub portion 50 defines a tapered bore 53 received on a tapered portion 54 of shaft 56. Shaft 56 also has a threaded end 58 which is engaged in this case by nut 34 so as to secure flywheel 32. It can be seen that a configured hole 60 is defined in the end of nut 34 for receipt of a driven element (e.g., flexible rod 36).

Certain additional details of flywheel 32 can be most easily explained with reference to FIG. 3B. As can be seen, flywheel 32 includes an integral core carrying portion 62, in which the permanent magnet assembly is embedded. An integral counterweight portion 64 is also provided to balance core carrying portion 62 during rotation of flywheel 32. In this case, core carrying portion 62 is mounted at a location diametrically opposite to that of counterweight portion 64.

A plurality of vane members (or "fins"), such as those indicated at 66, are formed on flywheel 32 to circulate cooling air around the engine. A key 68 is located in tapered bore 53, as shown. Key 68 is received in a corresponding keyway defined in shaft 56.

Figure 4A:
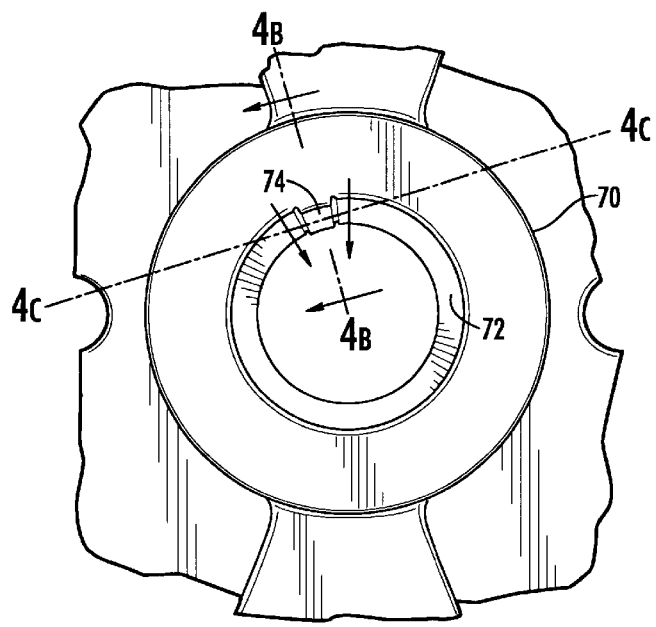
FIG. 4A is an enlarged plan view of the hub portion of a prior art flywheel showing the key located in the hub's tapered bore.
Figure 4B:
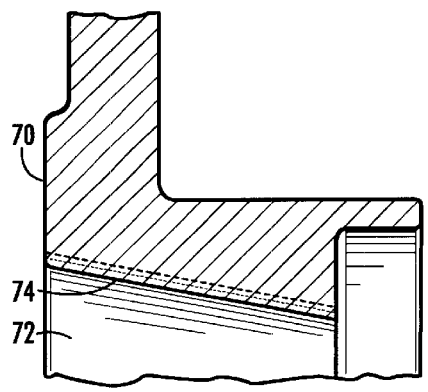
FIG. 4B is an enlarged cross sectional view of the key taken along line 4B—4B of FIG. 4A.

In order to place the invention in context, it is helpful to first review certain further aspects of the prior art. Toward this end, FIG. 4A illustrates a typical hub portion 70 as may be found in a prior art flywheel. Hub portion 70 defines a tapered bore 72 extending therethrough for receipt on the tapered portion of the engine's drive shaft. A key 74 is received in a corresponding keyway defined on the drive shaft. As shown in FIG. 4B, it can be seen that key 74 extends the entire axial length of tapered bore 72.

Figure 4C:
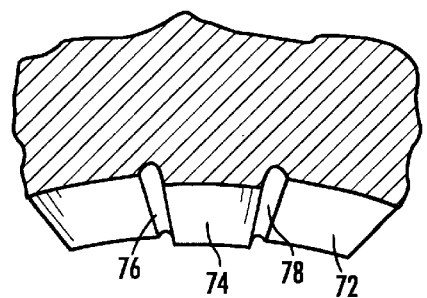
FIG. 4C is an enlarged cross sectional view of the key taken along line 4C—4C of FIG. 4A.

Referring now to FIG. 4C, deep-cut stress reliefs 76 and 78 are provided along each lateral side of key 74. As a result, the sidewalls of key 74 do not extend directly up from the inner surface of tapered bore 72, but extend up from the trough of the corresponding deep-cut stress relief. The conventional wisdom in the art is that stress reliefs of this type are needed to keep the keyway from shearing off the cast-in key.

In accordance with the present invention, it is found that breakage due to overtightening has tended to occur in the stress relief area. Specifically, cracks produced in a flywheel due to overtightening have often begun at the deep-cut stress reliefs located adjacent to the flywheel's key. Thus, a feature believed necessary to prevent damage to the key has itself served to facilitate damage to the overall flywheel.

In accordance with the present invention, it has been found that deep-cut stress reliefs undesirably contribute a bending moment to the key and the hub along with the predictable direct shear. The combined stress of the bending moment and the direct shear causes cracks in either the key or hub areas, or both. Furthermore, and surprisingly, it has been found that deep-cut stress reliefs are not necessary to prevent the key from shearing off during tightening of the flywheel or operation of the engine.

Figure 5A:
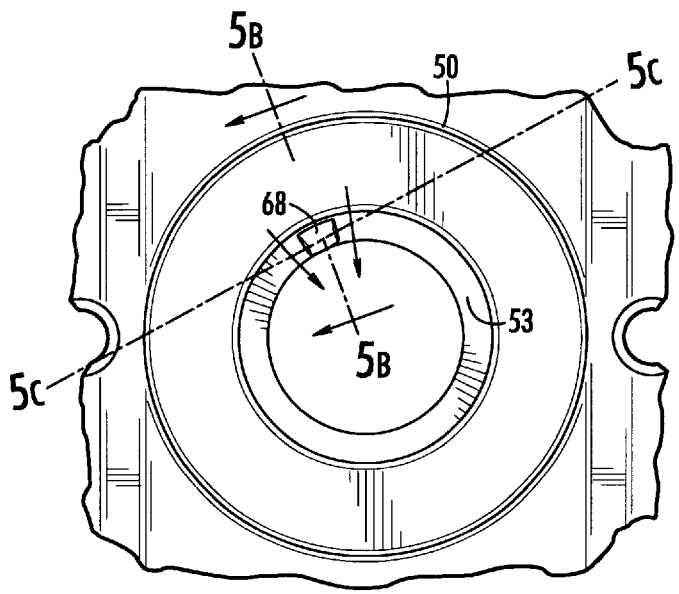
FIG. 5A is an enlarged plan view similar to FIG. 4A showing a key manufactured in accordance with the present invention.

Referring now to the remaining figures, the present invention provides a key which is configured so as to lessen the occurrence of overtightening breakage that has been attributed to deep-cut stress reliefs. Thus, as shown in FIGS. 5A through 6, key 68 is constructed having sidewalls 80 and 82 extending directly from the inside surface of tapered bore 53. A top surface 84 extends between sidewalls 80 and 82, as shown. It can be seen that key 68 does not utilize deep-cut stress reliefs as have been utilized in the past.

Figure 5B:
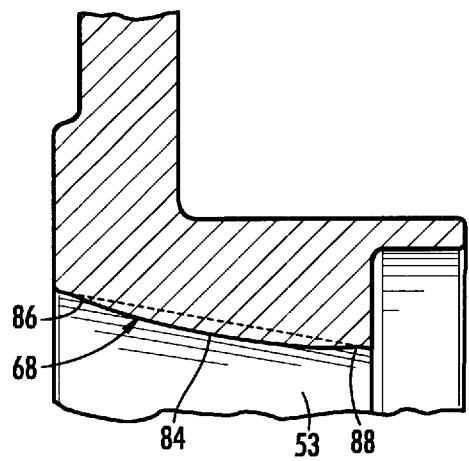
FIG. 5B is an enlarged cross sectional view of the key taken along line 5B—5B of FIG. 5A.
Figure 5C:
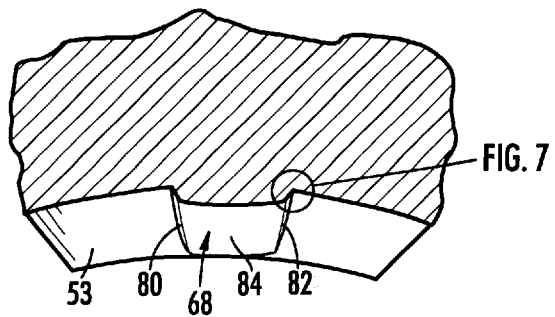
FIG. 5C is an enlarged cross sectional view of the key taken along line 5C—5C of FIG. 5A.
Figure 6:
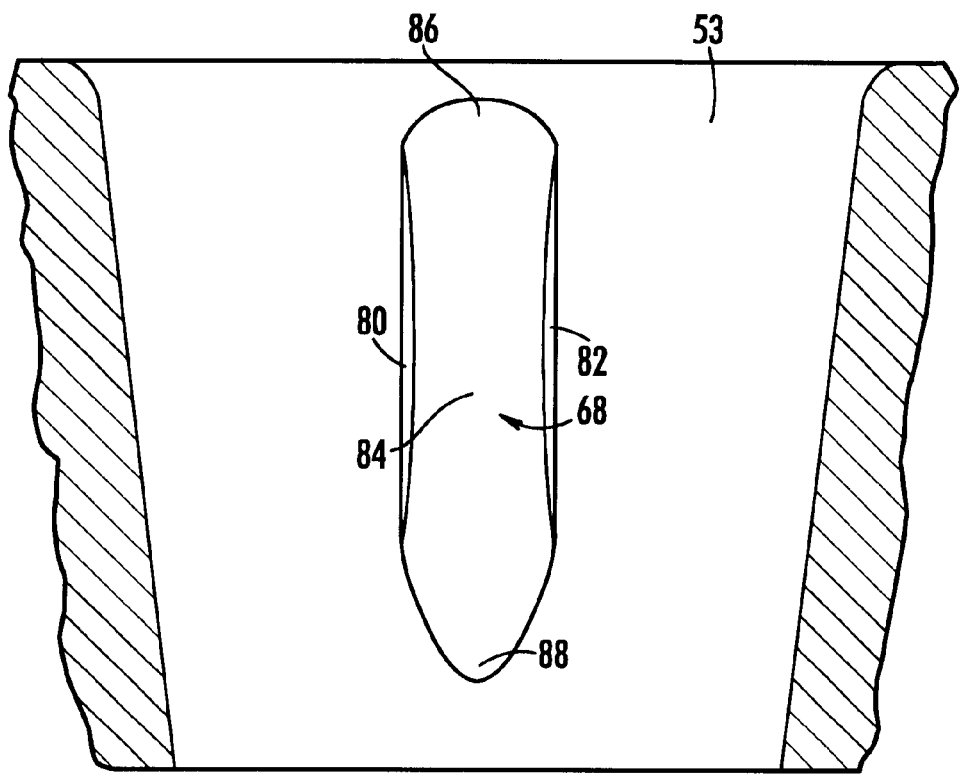
FIG. 6 is an enlarged elevational view of the key shown in FIG. 5A.

As can be seen most clearly in FIG. 5B, top surface 84 of key 68 may have an arcuate profile in the axial direction of bore 53. Preferably, the axial extent of key 68 will be less than the axial extent of bore 53. For example, ends 86 and 88 of top surface 84 may terminate by convergence into the inside surface of bore 53. This construction provides a key of "low profile" which serves to favorably locate the angular orientation of flywheel 32. It will be appreciated that the keyway of drive shaft 56 may also be defined having a "low profile" corresponding to that of key 68.

Figure 7:
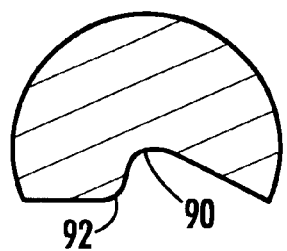
FIG. 7 is an enlarged fragmentary view of the portion so indicated in FIG. 5C.

Key 68 is preferably configured having small radiuses at the corners so as to eliminate straight corners which could be susceptible to shearing. This is illustrated, for example, in FIG. 7 where radiussed corners 90 and 92 can be clearly seen. Thus, the construction of the present invention provides relief from shearing stress, as desired, without contributing an undesirable bending moment as has been seen in the prior art design.

While presently preferred embodiments of the invention have been shown and described, it should be understood that various modifications and variations may be made thereto by those of ordinary skill in the art. For example, flywheel 32 is illustrated in FIG. 2 with its "finned" side directed toward the engine. In other embodiments, it may be desirable to reverse the flywheel's orientation such that the "finned" side is directed away from the engine.

In addition, it should be understood that aspects of the various embodiments may be interchanged both in whole or in part. Furthermore, those of ordinary skill in the art will appreciate that the foregoing description is by way of example only, and it is not intended to be limitative of the spirit and scope of the invention so further set forth in the following claims.

What is claimed is:

1. A flywheel mountable to a drive shaft of an internal combustion engine, said flywheel comprising:

a flywheel body including a central hub portion and an integral wheel portion;

said hub portion of said flywheel body defining an axial bore, said drive shaft being received in said axial bore when said flywheel is mounted thereon; and an integral key located in said axial bore for receipt in a corresponding keyway defined in said drive shaft, said integral key being formed without lateral stress reliefs such that opposed side walls extend directly from an inside surface of said axial bore about a radius located at a respective base of each said side wall.

2. A flywheel as set forth in claim 1, wherein said key has a top surface extending between said opposed side walls thereof, said top surface having an arcuate profile in the axial direction of said axial bore.

3. A flywheel as set forth in claim 2, wherein said key has an axial extent less than that of said axial bore.

4. A flywheel as set forth in claim 3, wherein said arcuate profile of said top surface of said key terminates at both ends thereof by convergence into said inside surface of said axial bore.

5. A flywheel as set forth in claim 4, wherein said axial bore has a conical configuration.

6. A flywheel as set forth in claim 1, wherein said flywheel has at least one magneto assembly located adjacent a periphery of said wheel portion.

7. A flywheel as set forth in claim 6, including:

a plurality of vane members integrally formed on said wheel portion and configured to pass air around said flywheel during operative rotation thereof; and at least one counterweight assembly located adjacent a periphery of said wheel portion so as to balance said magneto assembly during operative rotation of said flywheel.

8. A flywheel as set forth in claim 7, wherein said flywheel has an outer diameter of approximately 3.5 inches.

9. A flywheel mountable to a drive shaft of an internal combustion engine, said flywheel comprising:

a flywheel body including a central hub portion and an integral wheel portion;

said hub portion of said flywheel body defining an axial bore therethrough, said drive shaft being received in said axial bore when said flywheel is mounted thereon;

an integral key located in said axial bore for receipt in a corresponding keyway defined in said drive shaft, said key having opposed side walls and a top surface extending therebetween;

said integral key being formed without lateral stress reliefs such that said side walls of said key extend directly from an inside surface of said axial bore;

said top surface of said key having an arcuate profile in the axial direction of said axial bore;

a magneto assembly located adjacent a periphery of said wheel portion of said flywheel body;

a plurality of vane members integrally formed on said wheel portion and configured to pass air around said flywheel during operative rotation thereof; and at least one counterweight assembly located adjacent a periphery of said wheel portion so as to balance said magneto assembly during operative rotation of said flywheel.

10. A flywheel as set forth in claim 9, wherein said axial bore has a conical configuration.

11. A flywheel as set forth in claim 10, wherein said key has an axial extent less than that of said axial bore.

12. A flywheel as set forth in claim 11, wherein said arcuate profile of said top surface of said key terminates at both ends thereof by convergence into said inside surface of said axial bore.

* * * * *